United States Patent
Clark et al.

(10) Patent No.: US 9,015,666 B2
(45) Date of Patent: Apr. 21, 2015

(54) UPDATING PRODUCT DOCUMENTATION USING AUTOMATED TEST SCRIPTS

(75) Inventors: Adam T. Clark, Rochester, MN (US); John E. Petri, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 13/546,364

(22) Filed: Jul. 11, 2012

(65) Prior Publication Data
US 2014/0019937 A1    Jan. 16, 2014

(51) Int. Cl.
*G06F 9/44*    (2006.01)
*G06F 9/455*    (2006.01)

(52) U.S. Cl.
CPC . *G06F 8/73* (2013.01); *G06F 9/455* (2013.01)

(58) Field of Classification Search
CPC ............... G06F 7/78; G06F 8/00–8/78; G06F 9/44–9/455; G06F 11/36
USPC ................................................. 717/120–161
See application file for complete search history.

(56) References Cited

U.S. PATENT DOCUMENTS

| | | | |
|---|---|---|---|
| 6,966,052 B1 | 11/2005 | Grindeland et al. | |
| 7,222,333 B1 * | 5/2007 | Mor et al. | 717/115 |
| 7,461,342 B2 | 12/2008 | McLean | |
| 7,490,319 B2 | 2/2009 | Blackwell et al. | |
| 7,533,369 B2 | 5/2009 | Sundararajan et al. | |
| 2004/0172616 A1 * | 9/2004 | Rothschiller et al. | 717/114 |
| 2005/0144595 A1 * | 6/2005 | McLean | 717/136 |
| 2006/0005132 A1 * | 1/2006 | Herdeg, III | 715/704 |
| 2008/0098357 A1 * | 4/2008 | Candelore | 717/127 |
| 2011/0202933 A1 * | 8/2011 | Sherrill | 719/328 |
| 2011/0307863 A1 * | 12/2011 | Malnati | 717/123 |
| 2012/0177291 A1 * | 7/2012 | Gronau et al. | 382/190 |
| 2012/0324425 A1 * | 12/2012 | Roberts et al. | 717/123 |
| 2013/0263090 A1 * | 10/2013 | Polk et al. | 717/124 |
| 2014/0173562 A1 * | 6/2014 | Rothley et al. | 717/123 |

OTHER PUBLICATIONS

Roman Stumm, Automatic Documentation with Flex-UI-Tests, 2011, http://www.viaboxxsystems.de/automatic-documentation-with-flex-ui-tests.*
Stumm, Automatic Documentation with Flex-UI-Tests, 2011.*
McBurney et al., Automatic Documentation Generation via Source Code Summarization of Method Context, 2014.*
Sridhara, Automatic Generation of Descriptive Summary Comments for Methods in Object-Oriented Programs, 2012.*

* cited by examiner

*Primary Examiner* — Wei Zhen
*Assistant Examiner* — Zhan Chen
(74) *Attorney, Agent, or Firm* — Patterson & Sheridan, LLP

(57) ABSTRACT

Techniques are disclosed for generating and updating product documentation. The techniques include monitoring a script being executed to test the functionality of an application. The script may have one or more tags associated with corresponding tags in documentation associated with the application. The techniques further include capturing, during execution of the script, content items from the application based on the one or more tags of the script and inserting the captured content items into the documentation at locations indicated by the corresponding tags of the documentation.

15 Claims, 7 Drawing Sheets

UPDATING PRODUCT DOCUMENTATION USING AUTOMATED TEST SCRIPTS

BACKGROUND

1. Field of the Invention

The present invention generally relates to techniques for managing product documentation, and, more specifically, to techniques for generating and updating product documentation by capturing application content when executing automated test scripts.

2. Description of Related Art

Among other things, product documentation is often used to describe the use, administration, and programming interfaces of software applications. For example, product documentation may include text descriptions and screen images to instruct users on how to perform a given task using the application. Product documentation may be updated for each release of the product to reflect changes to the product since the last release.

To produce good documentation, software developers typically write product documentation themselves or hire technical writers to create the product documentation. However, such techniques can be tedious, labor-intensive, and expensive.

SUMMARY

This disclosure presents methods for generating and updating product documentation. The methods include monitoring a script being executed to test the functionality of an application. The script may have one or more tags associated with corresponding tags in documentation associated with the application. The methods further include capturing, during execution of the script, content items from the application based on the one or more tags of the script and inserting the captured content items into the documentation at locations indicated by the corresponding tags of the documentation. Because portions of the documentation are automatically generated and updated, embodiments disclosed herein alleviate the expenses and burdens of creating and updating product documentation.

Further embodiments of the present invention include a computer-readable storage medium storing instructions that, when executed by a computer system, cause the computer system to perform one or more aspects of the disclosed techniques, and a system programmed to carry out one or more aspects of the disclosed techniques.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
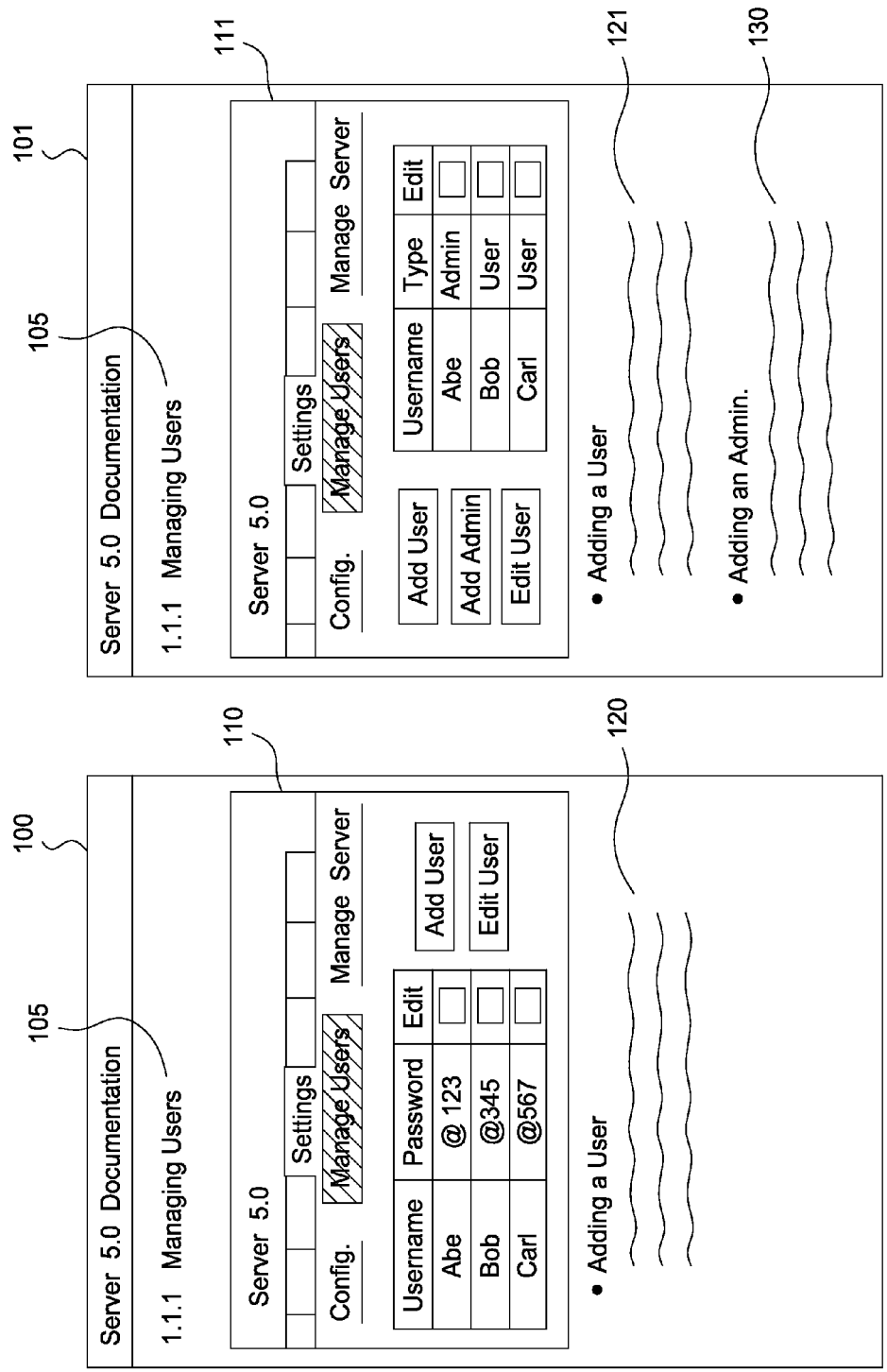
FIG. 1 illustrates example pages of product documentation, according to one embodiment of the invention.

Embodiments discussed herein generate new and/or update existing product documentation in conjunction with automated test scripts. Automated test scripts are programs which test the features of a software application. For example, an automated test script may be used to verify that a series of steps that users ordinarily take (e.g., logging in, selecting a menu, etc.) produces a desired result.

In one embodiment, an analysis application updates product documentation based on tags in an automated test script which correlate portions of the test script with locations in product documentation. As the test script executes, the analysis application may identify the tags at various locations in the test script code. As those portions of code are executed, the analysis application may update product documentation by, for example, adding a screenshot of the application to the product documentation at the correlated location. Such a location may be indicated by a tag in the documentation that corresponds to the tag in the test script.

In a further embodiment, the analysis application may itself insert tags into the test script. As the test script executes, the analysis application may analyze text and images generated by the application to identify features of the application which are described in the documentation and indicated by corresponding tags in the documentation. The analysis application may then insert tags at appropriate locations in (or around code of) the test script to correlate those locations (or code) with the tags in the documentation. When the test script is executed again (e.g., when a new release is being tested), the analysis application may capture screenshots based on the added tags in the test script so that any changes to the appearance of the application feature since the last execution of the test script may be reflected in the product documentation.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates example pages of product documentation, according to one embodiment of the invention. In general, product documentation may include one or more files (e.g., .pdf files) having pages which explain various aspects of an application and how to use the application.

As shown in panel A, documentation page 100 includes screenshot 110 and text elements 105, 120. As shown, the screenshot 110 and text elements 105, 120 relate to managing users of an application. In particular, the screenshot 110 illustrates a graphical interface for managing users, while text element 120 describes how to add a user. In one embodiment, an automated documentation component may add one or more of screenshot 110 and text elements 105, 120 to the page 100 based on tags (not shown) in the page 100 and corresponding tags in a script which tests functionalities of the application.

As shown in panel B, an updated page of the exemplary product documentation 101 includes screenshot 111 and text elements 105, 121, and 130. The updated page 101 may correspond to, for example, a newer release of the application.

As shown, the screenshot 111 differs from the screenshot 110 in the page 100 in that the layout and content of the depicted interface is changed. For example, the screenshot 111 includes an additional "Add Admin" button, which appears to the left of a table listing individual users. As further shown, the updated page 101 includes text element 130 which may describe, for example, how to add an admin and privileges that administrators have. In one embodiment, an automated documentation component (not shown) may help create page 101 by adding one or more of screenshot 111 and text elements 121, 130 to page 100 to replace screenshot 110 and text element 120, respectively, based on tags (not shown) in the page 100 and corresponding tags in a script which tests functionalities of the application.

Figure 2:
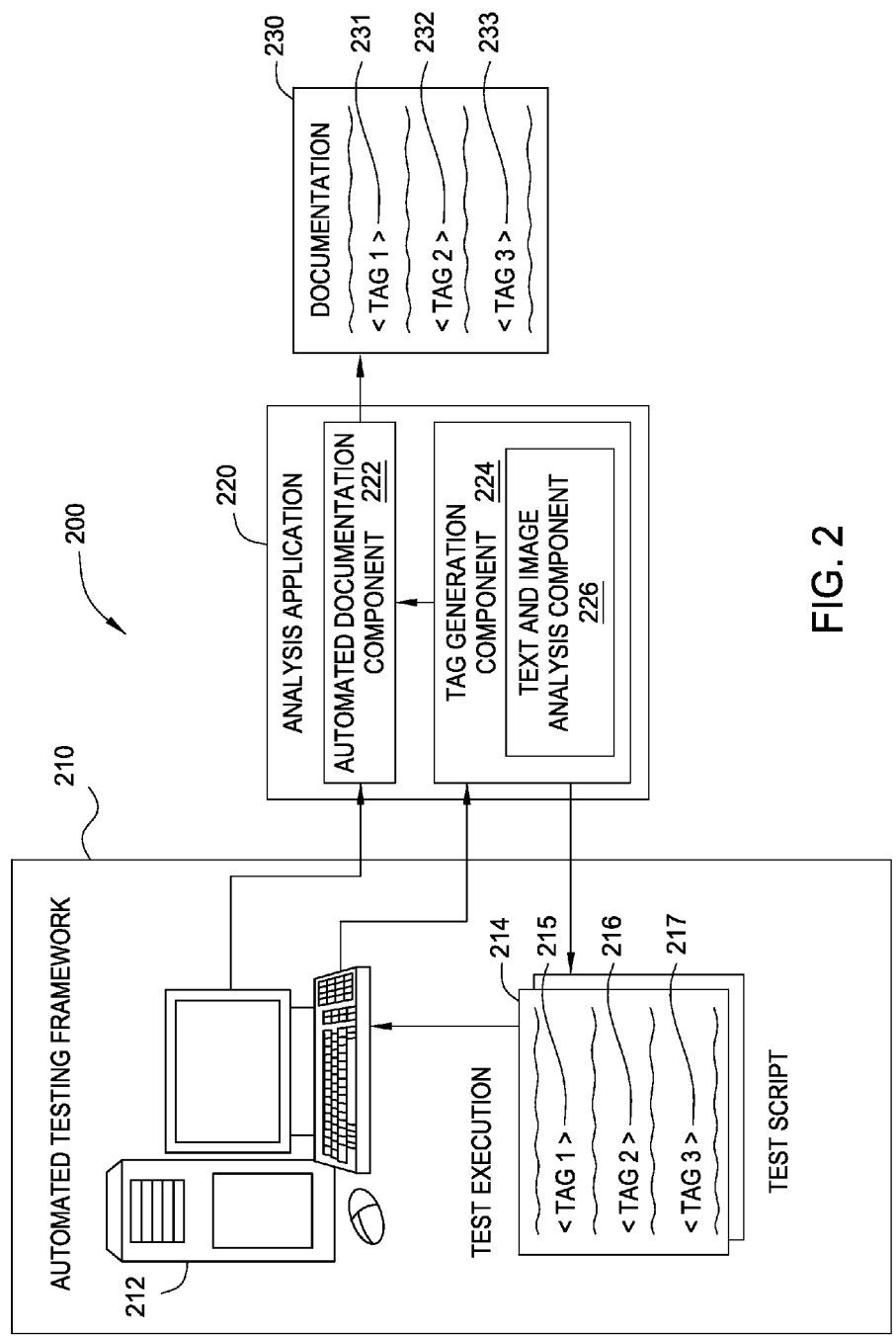
FIG. 2 depicts a system for updating product documentation using a test script, according to one embodiment of the invention.

FIG. 2 illustrates a system 200 for updating product documentation using a test script, according to one embodiment of the invention. As shown, the system 200 includes an automated testing framework 210, an analysis application 220, and documentation 230. The automated testing framework 210 performs functional testing by executing a test script 214 to analyze the behavior of the application. The test script 214 may be configured to test one or more functionalities of the application. For example, the test script may supply text into forms and click buttons to validate that the application behaves as expected given a particular set of inputs.

In addition to code for testing the application, the test script 214 further includes tags 215-217. The tags 215-217 may include metadata which indicate that code associated with those tags relate to one or more features of the application (e.g., a login or form processing sequence) discussed in the documentation 230. In particular, each of the tags 215-217 in the test script 214 may correspond to one or more of the tags 231-233 in the product documentation 230 indicating location(s) in the product documentation 230 where the application feature is discussed. In one embodiment, a pair of tags (e.g., "<feature1>" and "</feature1>") may be included around portion(s) of the test script 214 and/or documentation 230 associated with the application feature identified by the tags. In a further embodiment, the tags 215-217 may be reused across common portions of the test script 214, allowing for frequently tested functionalities to be standardized and easily recognized throughout the application. For example, some tags may represent general actions (e.g., "<Screenshot>" or "<TableText>" or "<ParagraphText>"), and such tags may be thought of as sub-tags of feature tags. More specifically, such tags would not indicate particular features, and would instead indicate common actions to be taken for a given feature being documented. The automated testing framework 210 further includes test execution 212, during which the script is run to test the application.

The documentation 230 may disclose various aspects of the product. As discussed above, the documentation 230 includes tags 231-233. The tags 231-233 may include metadata indicating what portion of the documentation 230 discusses a corresponding feature. For example, a portion of the documentation 230 describing a particular feature of the application may be identified by a unique tag. Further, each of the tags 231-233 may be associated with one or more of the tags 215-217 of the test script 214. For example, each of tags 231-233 in the documentation 230 may simply have the same name or label as one or more of the tags 215-17 in the test script 214.

In one embodiment, tags 231-233 are added to the documentation 230 by the document author. For example, the document author may add information to the documentation 230 but leave certain portions which require screenshots empty. The author may then annotate the empty portions with the tags 231-233. Further, the author may create a file having a list of the tags 231-233 for comparison purposes with the tags 215-217 in the test script. In alternative embodiments, the tags 231-233 and/or the file having the list of tags may be generated automatically.

Illustratively, the analysis application 220 shown in FIG. 2 includes an automated documentation component 222 and a tag-generation component 224. The automated documentation component 222 generates or updates one or more portions of the documentation 230. In particular, the automated documentation component 222 may capture a screenshot of the application being tested by the test script 214 when execution of the test script reaches each of the tags 215-217. For example, a script interpreter may pause while executing the test script when it encounters a tag. Further, once paused, the script interpreter may capture a screenshot of the application. Additionally, the script interpreter may capture values for form elements, or program variables, input/output states as needed for a particular case. The automated documentation component 222 may consume the resulting information to generate or update parts of product documentation 230 which discuss the feature of the application associated with the tag.

As shown, the tag-generation component 224 includes a text and image analysis component 226. The text and image analysis component 226 analyzes the application during execution of the test script 214 to determine whether content associated with the tags 231-233 in the documentation 230 is currently being displayed. For example, the text and image analysis component 226 may determine based on a screenshot whether text being displayed (e.g., in the title bar of a dialog window) or near an area of the application which is being clicked relates to one or more of the features corresponding to the tags 231-233. Likewise, the text and image analysis component 226 may identify whether icons, graphics, widgets, etc. of the screenshot relate to the tags 231-233. In alternative embodiments, the text and image analysis component 226 may further analyze the text of the test script 214 to determine which, if any, portions of code correspond to tags 231-233. For example, the text and image analysis component 224 may determine that a portion of code is directed to filling out a form which is discussed as a feature of the application in the documentation 230 and indicated by one of the tags 231-233.

Based on the application features identified by the text and image analysis component 226, the tag generation component 224 may insert one or more tags into test script 214. For example, tag generation component 224 may add tags to the test script 214 as metadata associated with a portion of the test script code. Tag generation component 224 may send a message to automated documentation component 222 to take a screenshot of the application and add it to an appropriate location in the documentation 230. During later execution of the test script 214 (e.g., when the test script 214 is run before another release of the product), automated documentation component 222 may take a screenshot based on the tag in the test script 214. As a result, changes to the application feature may be reflected in the documentation 230.

Although described above as included in the analysis application 220, parts of the automated documentation component 222 may be included in the test script 214 itself. For example, the test script 214 may include code for taking screenshots and adding those screenshots to appropriate locations in the documentation 230. Further, the tag generation component 224 may insert tags which include code into the test script 214 at appropriate locations for taking such screenshots.

Figure 3:
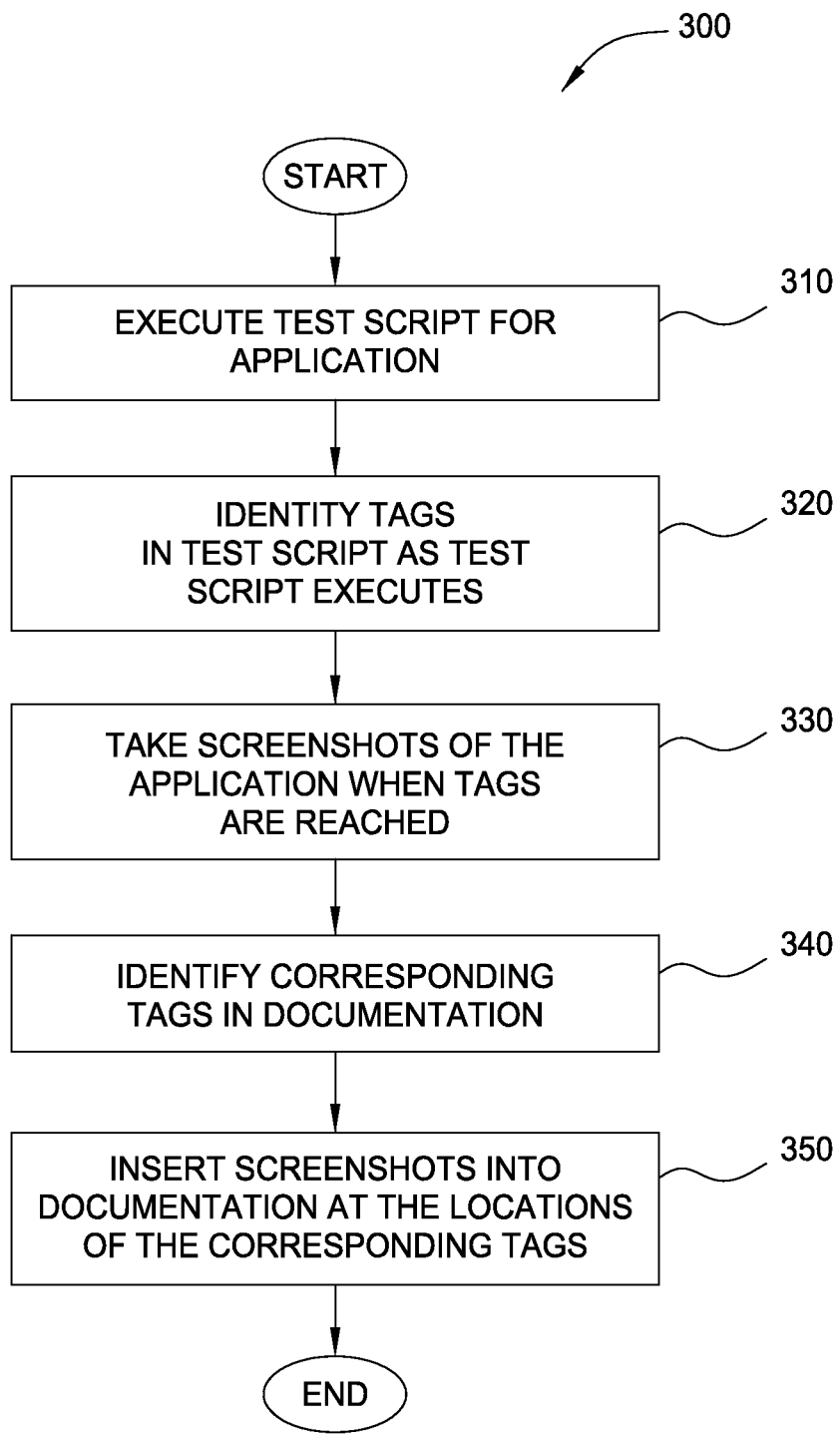
FIG. 3 illustrates a method for updating product documentation as a test script executes, according to one embodiment of the invention.

FIG. 3 illustrates a method 300 for updating product documentation, according to one embodiment. Although the method steps are described in conjunction with FIG. 2, persons skilled in the art will understand that any system configured to perform the method steps, in any order, falls within the scope of the present invention.

The method 300 begins at step 310, where the automated testing framework 210 executes the test script 214 for the application. At step 320, the analysis application 220 identifies tags 215-217 in the test script 214 as the test script 214 executes. For example, the analysis application 220 may identify a tag by matching a string of metadata characters with a predefined string for the tag. Note, the analysis application may run concurrently with a script interpreter executing the test script (and the application being driven by the test script).

At step 330, the analysis application 220 captures a screenshot of the application after each of the tags is reached during execution of the test script 214. For example, a script interpreter may pause while executing the test script when it encounters a tag. Further, once paused, the script interpreter may capture a screenshot of the application. In an alternative embodiment, the test script 214 itself may include code for taking screenshots at predefined points during the test script's 214 execution. In such a case, the script interpreter may take screenshots as part of the execution of the test script 214.

At step 340, the analysis application 220 identifies tags 231-233 in the documentation 130 corresponding to the tags 215-217 in the test script. As described above, each of the tags 215-217 in the test script 214 may correspond to one or more of the tags 231-233 in the documentation 230. As a result, analysis application 220 may identify which tag or tags 231-233 in the documentation 230 correspond to the tags 215-217 for which screenshots were taken. Further, analysis application 220 may determine the location of those tag or tags 231-233 as they appear in the documentation 230.

At step 350, the analysis application 220 inserts the screenshots taken at step 330 into the documentation 230 at the locations of the identified tags 215-217. In one embodiment, the analysis application 220 may further insert an indication in the documentation 230 that the screenshot was added. Such an indication may, for example, alert a user of the possible need to alter the text of the documentation 230 to be consistent with the new screenshot.

Figure 4:
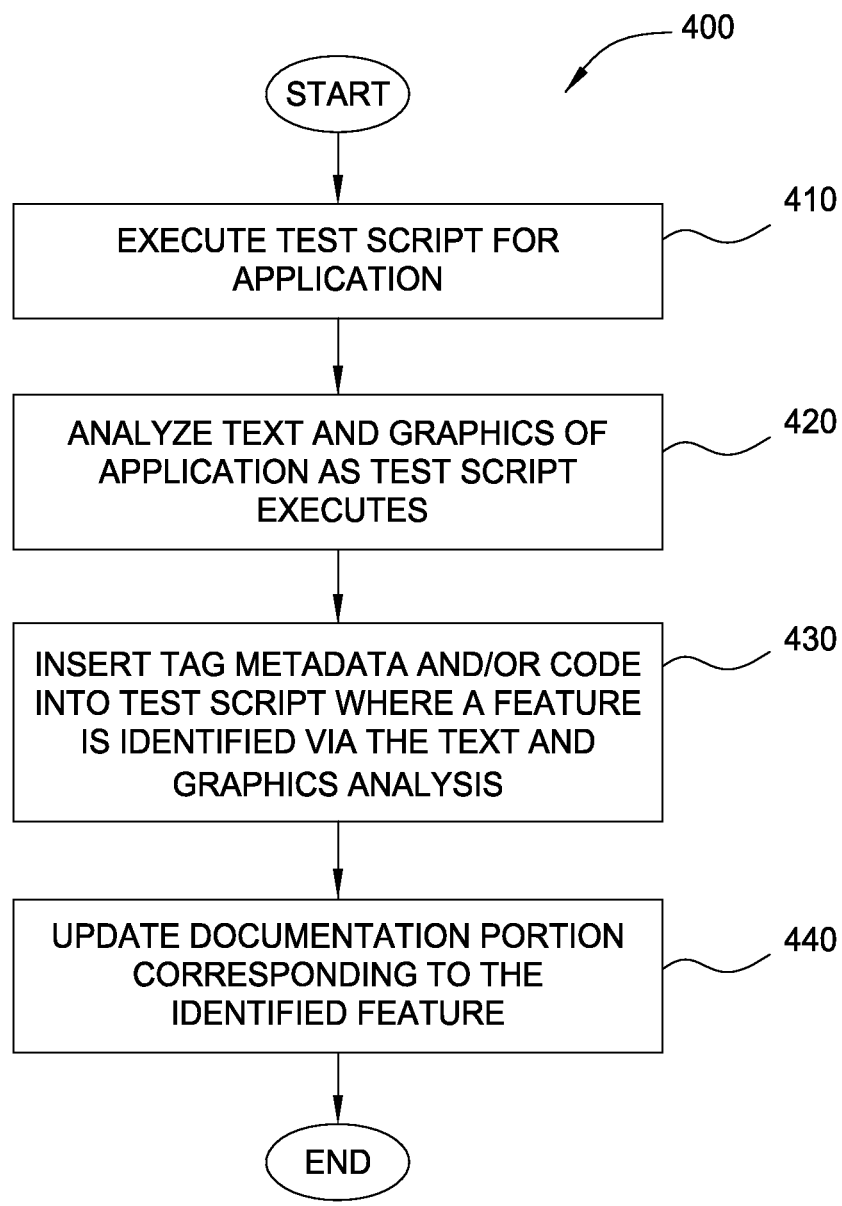
FIG. 4 illustrates a method for analyzing a test script during its execution, according to one embodiment of the invention.

FIG. 4 illustrates a method 400 for analyzing a test script during its execution to update documentation and modify the test script, according to one embodiment of the invention. Although the method steps are described in conjunction with FIG. 2, persons skilled in the art will understand that any system configured to perform the method steps, in any order, falls within the scope of the present invention.

The method 400 begins at step 410, where the automated testing framework 210 executes the test script 214. At step 420, the text and image analysis component 226 analyzes the application as the test script 214 executes. For example, the text and image analysis component 226 may determine based on a screenshot whether text being displayed or near an area of the application which is being clicked relates to one or more application features corresponding to tags 231-233. In such a case, the text and image analysis component 226 may, for example, match the text being displayed or near an area being clicked to text of the tags 231-233 based on simple character comparisons or based on semantic meaning. In an alternative embodiment, text and image analysis component 226 may further analyze the test script 214 itself to determine which, if any, portions of code correspond to the tags 231-233. For example, the text and image analysis component 226 may determine that a portion of code is directed to filling out a form which is associated with a particular tag.

At step 430, the tag generation component 224 inserts tag metadata and/or code into the test script 117 where an application feature is identified via text and graphics analysis. That is, the analysis application adds metadata and/or code to the test script 117 so that if the test script is executed again (e.g., during testing of a later product release), a screenshot will be taken when the metadata and/or code is encountered in the test script's 214 execution. Further, the metadata and/or code may be associated with one or more of the tags 231-233 in the documentation 230 so that when a screenshot is taken based on the metadata and/or code, the screenshot can be inserted into the documentation at locations indicated by associated tags 231-233.

In one embodiment, the analysis application 220 may further insert tags into the test script to indicate new features and notify the user about the new features. For example, the text and image analysis component 226 may be configured to identify when the content displayed by the application is not associated with any of the tags 231-233 in the documentation 230. In such a case, the analysis application 220 may add placeholder tags to the test script 214 and/or the documentation 230, as well as indicators to notify the document author of the new content.

In an alternative embodiment, the analysis application 220 may insert tag metadata and/or code into the test script without identifying features via text and image analysis. In such a case, certain changes in application state may be used to drive the capture of screenshots for use in the product documentation 230. For example, the application being tested may include a log-in form. During testing, the analysis application 220 may determine that the form is presented, text is entered into form elements, and a new screen is presented. The analysis application may then insert tags associated with "present form," "fill in form," and "submit form and receive response" (e.g., tags "<feature 1>," "<feature 2>," and "<feature 3>") in appropriate locations of the test script. Screenshots may also be taken to show each of these states. Note, in such a case, the analysis application 220 need not have semantic or conceptual understandings of form content. Rather, it would be up to the document author to map the tags associated with "present form," "fill in form," and "submit form and receive response" and/or the screenshots to locations in the documentation 230.

At step 440, the analysis application 220 updates portions of the documentation 230 corresponding to the identified features. For example, the analysis application may take a screenshot of the application and include the screenshot in the documentation 230 at locations identified by the tags 231-233 which correspond to the identified feature. In one embodiment, the analysis application may further indicate in the documentation 230 that the screenshot is new. In such a case, a user may, for example, be alerted to the potential need to revise text corresponding to the previous screenshot to be consistent with the new screenshot.

Although described above with respect to adding screenshots to the documentation 230, the analysis application 220 may, in alternative embodiments, alter the documentation 230 in other ways. For example, the analysis application 220 may add text to the documentation 230 by, for example, copying text displayed in the application into the documentation. The analysis application 220 may also insert, for example, titles, captions, bullet points, etc. to the documentation 230. In addition, the analysis application 220 may be configured to determine which screenshots and/or other content is relevant to add to the documentation 230. For example, to illustrate filling out and submitting a form element within the application, the analysis application 220 may be configured to only add to the documentation 230 screenshots of the application before and after the test script enters text into the form element and clicks the form's submit button.

Figure 5:
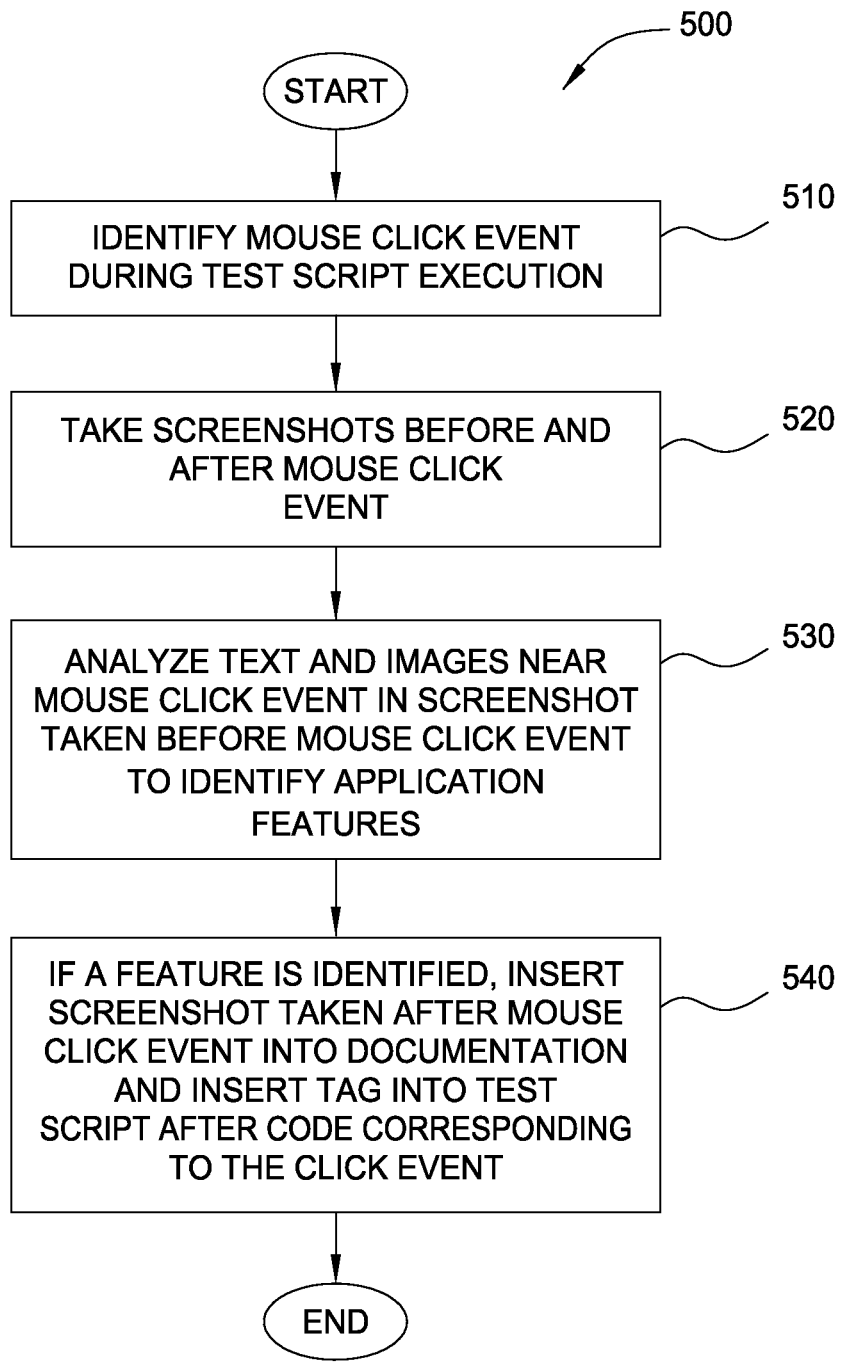
FIG. 5 illustrates a more detailed method for analyzing a test script during its execution to update documentation and modify the test script, according to one embodiment of the invention.

FIG. 5 illustrates a more detailed method 500 for analyzing a test script 214 during its execution to update the documentation 230 and modify the test script 214, according to one embodiment. Although the method steps are described in conjunction with FIG. 2, persons skilled in the art will understand that any system configured to perform the method steps, in any order, falls within the scope of the present invention.

The method 500 begins at step 510, where the tag generation component 224 identifies a mouse click event during execution of the test script 214. In one embodiment, the tag generation component 224 may analyze code of the test script 214 to identify places where mouse clicks are programmed to occur. Further, the tag generation component 224 may identify from the code the location (e.g., coordinates) of the mouse click.

At step 520, the tag generation component 224 causes screenshots to be taken before and after the mouse click event. For example, immediately before test script 214 code for a mouse click is executed, the tag generation component 224 may cause a screenshot to be taken. Similarly, immediately after test script 214 code for the mouse click is executed, the tag generation component 224 may cause another screenshot to be taken. Alternatively, the tag generation component 224 may wait a period of time (e.g., seconds) before taking the screenshot after the mouse click event.

At step 530, the text and image analysis component 226 analyzes text and images near the mouse click event in the screenshot taken before the mouse click event to identify application features described in the product documentation. Various text and image analysis techniques may be used. For example, the text and image analysis component 226 may use optical image recognition (OCR) techniques to recognize text in the screenshot. The text and image analysis component 226 may also use image recognition techniques to identify icons, graphics, widgets, etc. in the screenshot.

To identify application features, the text and image analysis component 226 may, for example, compare text and images within a box bounding the mouse click location with predefined features of the application. Suppose a button is clicked. The text and image analysis component 226 may use OCR to determine text within a bounding box of the mouse click which includes the button. The text and image analysis component 226 may then compare the text to text of predefined tags which correspond to various application features. In one embodiment, the text and image analysis component 226 may make such comparisons based at least in part on semantic meaning. That is, even if characters of a text description of an application feature (e.g., metadata characters of the tag) do not explicitly match characters of the text of the button, the text and image analysis component 226 may be able to associate the application feature with the text of the button. For example, such an association may be made if a threshold probability is exceeded indicating that the text description of the application feature and the text of the button mean roughly the same thing.

At step 540, the tag generation component 224 causes the screenshot taken after the mouse click at step 520 to be inserted into the documentation 230. In one embodiment, the tag generation component 224 may send a message to the automated documentation component 222, which may then insert the screenshot taken after the mouse click into the documentation 230 at one or more locations having tags 231-233 corresponding to the matching application feature determined at step 530. Further, the tag generation component 224 may insert tag metadata and/or code (e.g., for taking a screenshot) into the test script 214 after code corresponding to the click event. As a result of the inserted tag metadata and/or code, the automated documentation component 222 may take another screenshot at the same point during future executions of the test script (e.g., when testing is done for a future release).

Figure 6:
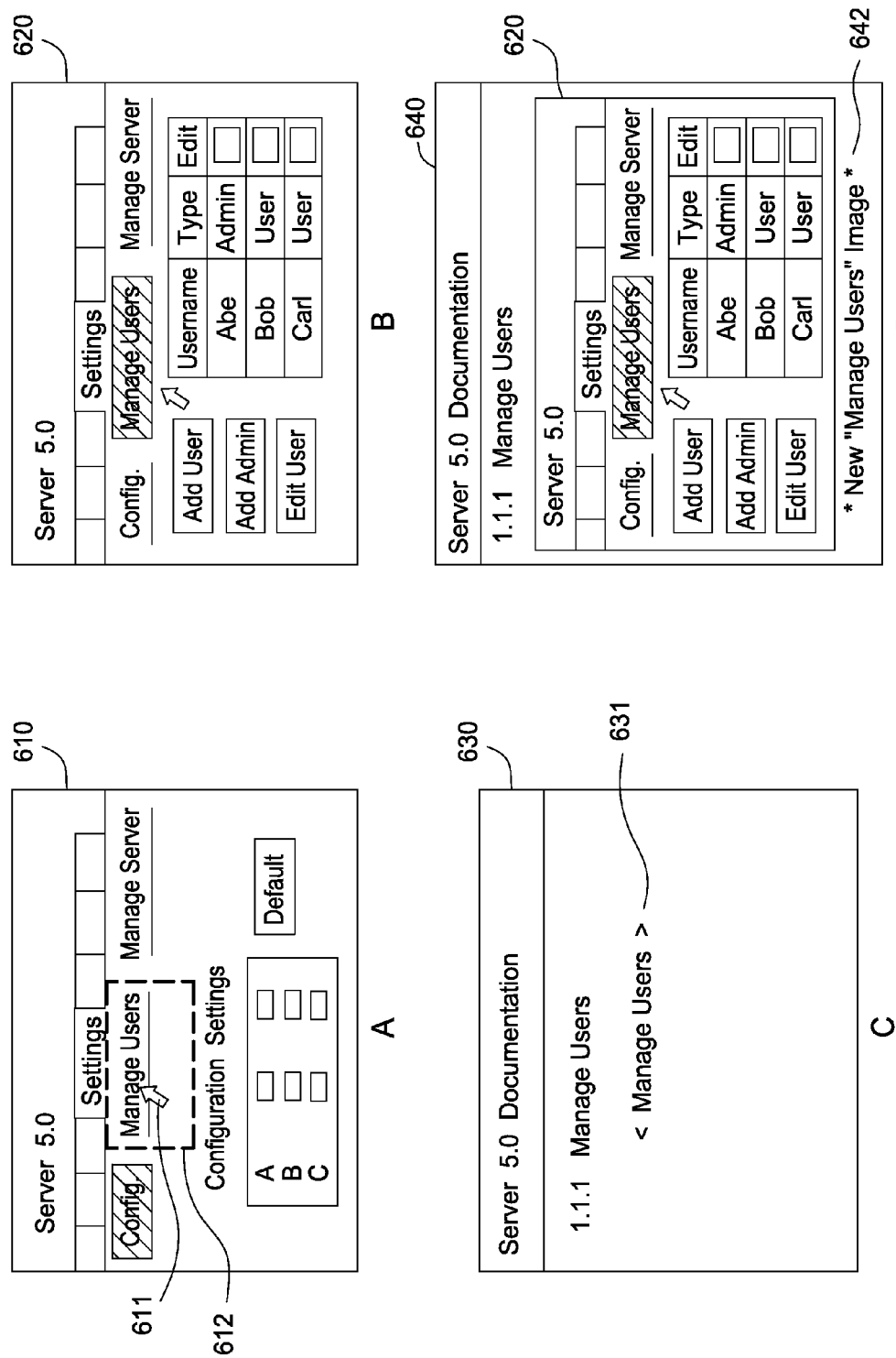
FIG. 6 illustrates screenshots of an application taken during test script execution and updating documentation based on analysis of the screenshots, according to one embodiment of the invention.

FIG. 6 illustrates screenshots of an application taken during test script execution and updating documentation based on analysis of the screenshots, according to one embodiment of the invention. Panel A shows a screenshot 610 of an application before a "Manage Users" button 612 is clicked during test script execution. As shown, the screenshot 610 depicts the "Config." tab highlighted and "Configuration Settings" available for user modification. FIG. 6 further shows a mouse pointer 611 and ghosted lines of a box bounding the mouse pointer 612. As discussed above, the text and image analysis component 226 may use, for example, OCR to determine the text in the box 612. Note, the box 612 may include extraneous text, such as text from the "Config." tab. Such text may also be identified via OCR by the text and image analysis component 226. However, the tag-generating component may be configured to ignore such extraneous text by, for example, only taking into account words or phrases closest to the location of the mouse click. Further, the tag-generating component may ignore extraneously text by considering only text within a displayed shape bounding the location of the mouse click (e.g., a border of a button being clicked).

Panel B shows a screenshot 620 of the application after the "Manage Users" tab button has been clicked. The test script 214 may cause the "Manage Users" tab button to be clicked so as to test the functionality of the tab button, as well as the functionality of various aspects of the interface for managing users. After the interface for managing users is displayed, the analysis application 220 may add the screenshot 620 of the application depicting the interface to the documentation 630, as discussed in greater detail below.

Panel C shows a documentation 630 for the application. As shown, the documentation 630 is incomplete in that it includes a "<Manage Users>" tag 631 corresponding to a manage users application feature in lieu of actual content. The tag 631 may indicate that screenshot(s) and/or text should be included by the analysis application 220 for the "manage users" feature at the tag's location. For example, the document author may have added information to the documentation 630 but left certain portions empty. The author may have then annotated the empty portions with tag 631 to indicate that that screenshot(s) and/or text relating to "manage users" should be added if they are encountered during test script execution.

Panel D shows documentation 640 after the screenshot 620 is inserted at the location of the tag 631. Note, in some embodiments, the screenshot 620 may be modified (e.g., to reduce its display resolution) before it is inserted into the documentation 640. As discussed above, the tag generation component 224 may determine via text and image analysis of the box 612 that the screenshot 620 relates to a manage users application feature corresponding to the tag 631. In one embodiment, characters of the text of the tag 631 may simply be matched to the "Manage Users" characters of the tab button being clicked. In an alternative embodiment, semantic meaning may be compared as appropriate.

After matching the text/image of the box 612 to the tag 631, the tag generation component 224 may then send a message to the automated documentation component 222 to include the screenshot 620 in the documentation 630 at the location indicated by the tag 631. As discussed above, the tag generation component 224 may further include tag metadata and/or code corresponding to the application feature in the test script 214 so that subsequent executions of the test script also trigger taking of a screenshot.

As further shown in FIG. 6, the documentation 640 includes an indicator 642, which may alert an author of the documentation 640 to the fact that the screenshot 620 is new. The document author may then add and/or revise text and other content of the documentation 640 so that other parts of the documentation 640 are consistent with the screenshot 620.

Figure 7:
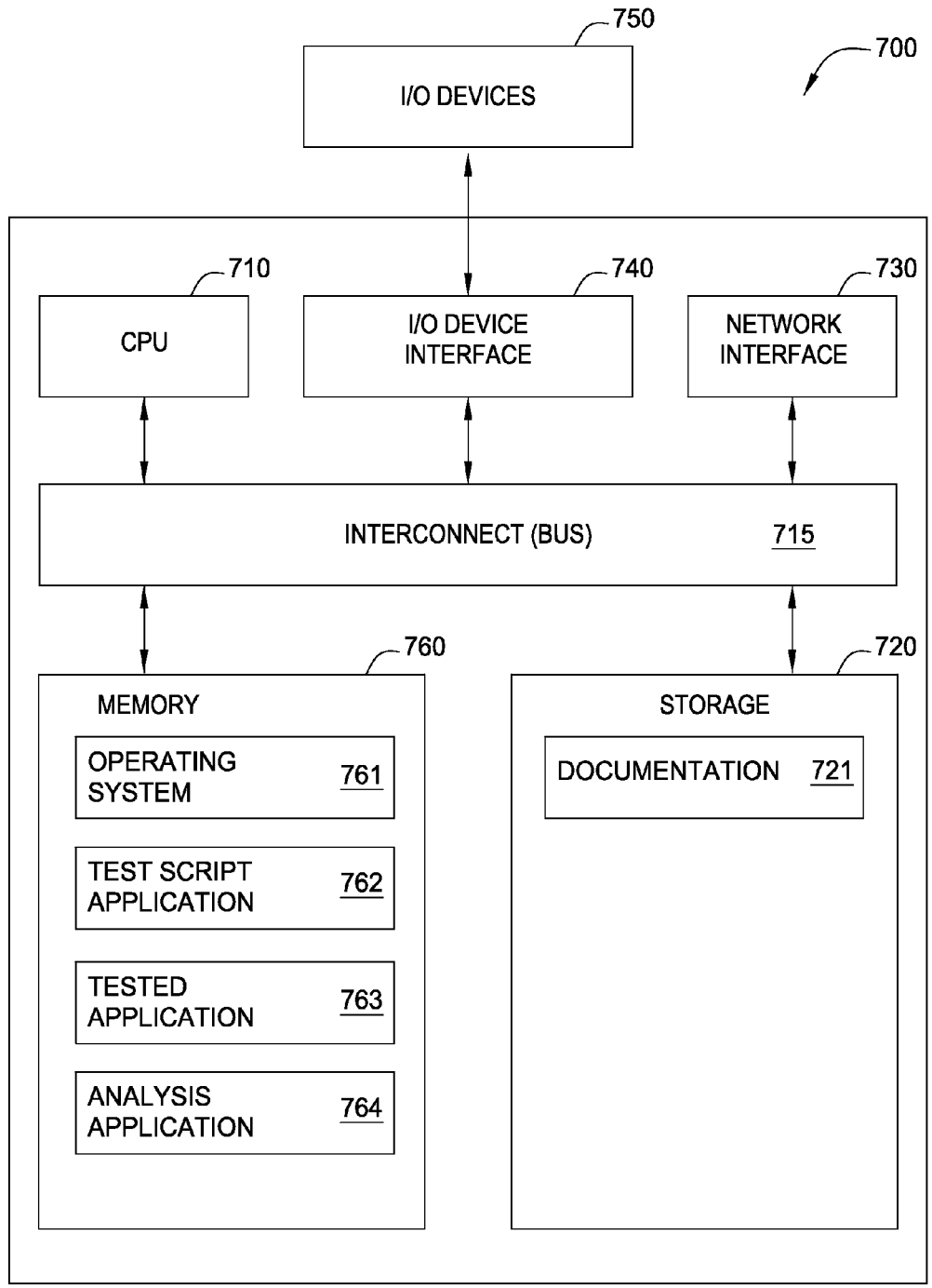
FIG. 7 depicts a block diagram of a system in which embodiments of the invention may be implemented.

FIG. 7 depicts a block diagram of a system in which embodiments of the invention may be implemented. As shown, the system 700 includes, without limitation, a central processing unit (CPU) 710, a network interface 730, an interconnect 715, a memory 760, and storage 720. The system 700 may also include an I/O device interface 740 connecting I/O devices 750 (e.g., keyboard, display and mouse devices) to the system 700.

The CPU 710 retrieves and executes programming instructions stored in the memory 760. Similarly, the CPU 710 stores and retrieves application data residing in the memory 760. The interconnect 715 facilitates transmission, such as of programming instructions and application data, between the CPU 710, I/O device interface 740, storage 720, network interface 730, and memory 760. CPU 710 is included to be representative of a single CPU, multiple CPUs, a single CPU having multiple processing cores, and the like. And the memory 760 is generally included to be representative of a random access memory. The storage 720 may be a disk drive storage device. Although shown as a single unit, the storage 720 may be a combination of fixed and/or removable storage devices, such as fixed disc drives, flash memory devices, optical storage, network attached storage (NAS), or a storage area-network (SAN). As shown, the storage 720 includes documentation 721, which may include text descriptions and screen images used to inform users how to perform a given task with the application.

Further, system 700 is included to be representative of a physical computing system as well as virtual machine instances hosted on a set of underlying physical computing systems. Further still, although shown as a single computing system, one of ordinary skill in the art will recognize that the components of the system 700 shown in FIG. 7 may be distributed across multiple computing systems connected by a data communications network.

As shown, the memory 760 includes an operating system 761 and applications 762-764. Applications 762-764 include a test script application 762, an application being tested 763, and an analysis application 764. As discussed above, the test script application 762 may be a script for automatically testing the functionality of an application product, such as the application being tested 763. In one embodiment, the analysis application 764 may be configured to identify tags in the test script while the test script application 762 is executing, to take screenshots when such tags are identified, and to insert the screenshots into locations of the documentation 721 having corresponding tags, as described above with respect to FIG. 3. In a further embodiment, the analysis application 764 may be configured to insert tags into the test script based on display output of the application during testing, as described above with respect to FIGS. 4 and 5.

Advantageously, embodiments disclosed herein use tags, which may be automatically generated, to correlate portions of the automated test script for a product application with content of the product documentation. As the test script is executed, embodiments disclosed herein automatically generate and update portions of the product documentation based on the tags. This alleviates the expenses and burdens of creating and updating product documentation.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   monitoring, via one or more processors, a script being executed to test the functionality of an application, wherein the script includes one or more tags associated with corresponding tags in documentation associated with the application, wherein each corresponding tag indicates a location in the documentation to insert a screenshot of the application;
   during execution of the script, evaluating text or graphics of one or more content items displayed by the application;
   upon determining, based on the evaluated text or graphics, that one or more of the content items displayed by the application is associated with a first feature associated with a first tag in the documentation, adding a tag corresponding to the first tag to the script;
   during execution of the script, when each of the one or more tags is encountered, capturing content items from the application, wherein the captured content items comprise at least a screenshot of the application captured at a point when each respective tag is encountered during the execution of the script; and
   inserting the captured content items into the documentation at the locations indicated by each of the corresponding tags of the documentation.

2. The method of claim 1, wherein at least one tag in the script includes code which performs the capturing of the content items and the inserting of the content items into the documentation.

3. The method of claim 1, wherein each one of the one or more tags in the script, and the tags in the documentation corresponding to the one of the one or more tags, correspond to a feature of the application described in the documentation.

4. The method of claim 1, further comprising determining at least a portion of code in the script tests the first feature.

5. The method of claim 1, wherein determining content item(s) displayed by the application while executing the script are associated with the first feature, includes determining via optical character recognition that text of a button being clicked by the script matches text included in the first tag in the documentation associated with the first feature.

6. The method of claim 1, further comprising:
   analyzing content items generated by the application in response to the script; and
   providing an indication to a user if at least one of text and images displayed by the application does not relate to any of the one or more tags of the script or the corresponding tags of the documentation.

7. The method of claim 1, further comprising, for each inserted content item, inserting an indication in the documentation indicating that the content item was inserted.

8. A non-transitory computer-readable storage medium storing instructions, which, when executed on a processor, perform an operation comprising:
   monitoring, via one or more processors, a script being executed to test the functionality of an application, wherein the script includes one or more tags associated with corresponding tags in documentation associated with the application, wherein each of the corresponding tags indicates a location in the documentation;

during execution of the script, evaluating text or graphics of one or more content items displayed by the application;

upon determining, based on the evaluated text or graphics, that one or more of the content items displayed by the application is associated with a first feature associated with a first tag in the documentation, adding a tag corresponding to the first tag to the script;

during execution of the script, when each of the one or more tags is encountered, capturing content items from the application, wherein the captured content items comprise at least a screenshot of the application captured at a point when each respective tag is encountered during the execution of the script; and inserting the captured content items into the documentation at the locations indicated by each of the corresponding tags of the documentation.

9. The computer-readable storage media of claim 8, wherein at least one tag in the script includes code which performs the capturing of the content items and the inserting of the content items into the documentation.

10. The computer-readable storage media of claim 8, wherein each one of the one or more tags in the script, and the tags in the documentation corresponding to the one of the one or more tags, correspond to a feature of the application described in the documentation.

11. The computer-readable storage media of claim 8, further comprising determining at least a portion of code in the script tests the first feature.

12. The computer-readable storage media of claim 8, wherein determining content item(s) displayed by the application while executing the script are associated with the first feature, includes determining via optical character recognition that text of a button being clicked by the script matches text included in the first tag in the documentation associated with the first feature.

13. The computer-readable storage media of claim 9, the operations further comprising:

analyzing content items generated by the application in response to the script; and providing an indication to a user if at least one of text and images displayed by the application does not relate to any of the one or more tags of the script or the corresponding tags of the documentation.

14. A system, comprising:

a processor; and a memory, wherein the memory includes an application program configured to perform operations comprising:

monitoring, via one or more processors, a script being executed to test the functionality of an application, wherein the script includes one or more tags associated with corresponding tags in documentation associated with the application, wherein each of the corresponding tags indicates a location in the documentation;

during execution of the script, evaluating text or graphics of one or more content items displayed by the application;

upon determining, based on the evaluated text or graphics, that one or more of the content items displayed by the application is associated with a first feature associated with a first tag in the documentation, adding a tag corresponding to the first tag to the script;

during execution of the script, when each of the one or more tags is encountered, capturing content items from the application, wherein the captured content items comprise at least a screenshot of the application captured at a point when each respective tag is encountered during the execution of the script; and inserting the captured content items into the documentation at the locations indicated by each of the corresponding tags of the documentation.

15. The system of claim 14, wherein each one of the one or more tags in the script, and the tags in the documentation corresponding to the one of the one or more tags, correspond to a feature of the application described in the documentation.

* * * * *